US012619605B2

(12) United States Patent
Edara et al.

(10) Patent No.: US 12,619,605 B2
(45) Date of Patent: **\*May 5, 2026**

(54) **ZERO COPY OPTIMIZATION FOR SELECT \* QUERIES**

(71) Applicant: Google LLC, Mountain View, CA (US)

(72) Inventors: Pavan Edara, Mountain View, CA (US); Jordan Tigani, Mountain View, CA (US)

(73) Assignee: Google LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/185,925

(22) Filed: Mar. 17, 2023

(65) Prior Publication Data

US 2023/0229657 A1     Jul. 20, 2023

Related U.S. Application Data

(63) Continuation of application No. 17/315,281, filed on May 8, 2021, now Pat. No. 11,609,909.

(Continued)

(51) Int. Cl.
G06F 16/2453     (2019.01)
G06F 16/22     (2019.01)
G06F 16/242     (2019.01)

(52) U.S. Cl.
CPC .... G06F 16/24535 (2019.01); G06F 16/2282 (2019.01); G06F 16/2445 (2019.01)

(58) Field of Classification Search
CPC .......... G06F 16/24535; G06F 16/2282; G06F 16/2445; G06F 16/24537

(Continued)

(56) References Cited

U.S. PATENT DOCUMENTS 6,754,661 B1 \*  6/2004  Hallin ..................... G06F 21/33
                                                                707/999.1
7,127,448 B1   10/2006  Wong
                        (Continued)

FOREIGN PATENT DOCUMENTS

CN          1666196 A       9/2005
CN          1864137 A      11/2006
                   (Continued)

OTHER PUBLICATIONS

K. England et al: "Microsoft SQL Server 2005 Performance Optimization and Tuning Handbook", Elsevier, Sep. 4, 2007, ISBN: 978-1-55558-319-4, DOI: 10. 1016 / B978-1-555 58-319-4.X5000-0.

(Continued)

*Primary Examiner* — Md I Uddin
(74) *Attorney, Agent, or Firm* — Shumaker & Sieffert, P.A.

(57)          ABSTRACT

A computer-implemented method includes receiving a query specifying an operation to perform on a first table of a plurality of data blocks stored. Each data block in the first table includes a respective reference count indicating a number of tables referencing the data block. The method also includes determining that the operation specified by the query includes copying the plurality of data blocks in the first table into a second table and, in response, for each data block of the plurality of data blocks in the first table copied into the second table, incrementing, the respective reference count associated with the data block in the first table, appending, by the data processing hardware, into metadata of the second table, a reference of the corresponding data block copied into the second table.

14 Claims, 8 Drawing Sheets

Memory 150

Associated Reference Count 154

| Data Block 152a | Reference Count 154a = 1 |
| Data Block 152b | Reference Count 154b = 1 |
| Data Block 152c | Reference Count 154b = 1 |
| Data Block 152d | Reference Count 154b = 1 |
| • • • | • • • |
| Data Block 152n | Reference Count 154n = 1 |

Table 158a

Each data block 152 of table 158a is located at a physical memory location of data store 150

Because each data bock 152 is currently associated with only table 158a, each reference count 154 is = 1.

Related U.S. Application Data

(60) Provisional application No. 63/023,409, filed on May 12, 2020.

(58) Field of Classification Search
USPC ....... 707/615, 616, 713, 602, 606, 610, 622, 707/736, 737, 758, 803, 809, 820, 707/999.001, 999.003, 17.008, 17.01, 707/17.014
See application file for complete search history.

(56) References Cited

U.S. PATENT DOCUMENTS

| | | | |
|---|---|---|---|
| 7,243,088 B2 | 7/2007 | Verma et al. | |
| 7,493,311 B1 | 2/2009 | Cutsinger et al. | |
| 9,613,064 B1 * | 4/2017 | Chou | G06F 16/182 |
| 9,946,486 B1 * | 4/2018 | Clifford | G06F 3/0608 |
| 10,489,356 B1 * | 11/2019 | Shah | G06F 16/211 |
| 11,609,909 B2 | 3/2023 | Edara et al. | |
| 2006/0161515 A1 | 7/2006 | Barsness et al. | |
| 2006/0190460 A1 | 8/2006 | Chandrasekaran et al. | |
| 2008/0183958 A1 | 7/2008 | Cheriton | |
| 2009/0070751 A1 | 3/2009 | Kreitzer et al. | |
| 2011/0179015 A1 | 7/2011 | Balebail | |
| 2011/0282864 A1 | 11/2011 | Collins et al. | |
| 2014/0006354 A1 * | 1/2014 | Parkison | G06F 3/0635 707/661 |
| 2016/0078023 A1 * | 3/2016 | Schalk | G06F 16/2386 707/825 |
| 2017/0123691 A1 * | 5/2017 | Cao | G06F 3/0689 |
| 2019/0121564 A1 * | 4/2019 | Guim Bernat | G06F 3/0608 |
| 2019/0129841 A1 * | 5/2019 | Kanno | G06F 3/0688 |

FOREIGN PATENT DOCUMENTS

| | | |
|---|---|---|
| CN | 101789024 A | 7/2010 |
| CN | 101908045 A | 12/2010 |
| CN | 106611044 A | 5/2017 |
| CN | 109086333 A | 12/2018 |
| CN | 110007869 A | 7/2019 |
| JP | H11120067 A | 4/1999 |
| JP | 2008530716 A | 8/2008 |
| WO | 03096230 A2 | 11/2003 |

OTHER PUBLICATIONS

Fuqi Song et al.: "Extended Query Pattern Graph and Heuristics-based SPARQL Query Planning", Procedia Computer Science, vol. 60, 2015, pp. 302-311, ISSN 1877-0509.

Office Action issued on the related IN Application No. 202247069575 dated Jan. 25, 2023.

USPTO. Office Action relating to U.S. Appl. No. 17/315,281, dated Jul. 26, 2022.

Communication pursuant to Article 94(3) EPC from counterpart European Application No. 21728772.1 dated Apr. 25, 2025, 14 pp.

England et al., "Microsoft SQL SErver 2005—Performance optimization and Tuning Handbook", Elsevier, Sep. 4, 2007, 217-353 pp.

International Search Report and Written Opinion of International Application No. PCT/US2021/031448 dated Jul. 21, 2021, 13 pp.

Miki Shimizu et al., "Developing Web-DB applications with Python framework Flask + SQLite 3!,", Nikkei software, vol. 22, No. 2, Jan. 24, 2019, pp. 94-113.

Notice of Intent to Grant, and translation thereof, from counterpart Japanese Application No. 2022568972 dated Mar. 31, 2023, 5 pp.

Prosecution History from U.S. Appl. No. 17/315,281, now issued U.S. Pat. No. 11,609,909, dated Jul. 26, 2022 through Feb. 9, 2023, 39 pp.

Response to Communication Pursuant to Rules 161(1) and 162 EPC dated Dec. 20, 2022, from counterpart European Application No. 21728772.1, filed Jun. 16, 2023, 21 pp.

Response to First Examination Report dated Jan. 23, 2023, from counterpart Indian Application No. 202247069575 filed Jun. 14, 2023, 41 pp.

Song et al., "Extended Query Pattern Graph and Heuristics—based SPARQL Query Planning", Procedia Computer Science, vol. 60, Elsevier, Sep. 7, 2015, 10 pp.

Response to Communication pursuant to Article 94(3) EPC dated Apr. 25, 2025, from counterpart European Application No. 21728772.1 filed Aug. 19, 2025, 15 pp.

Notice of Intent to Grant from counterpart Korean Application No. 10-2022-7042806 dated Mar. 27, 2026, 3 pp.

* cited by examiner

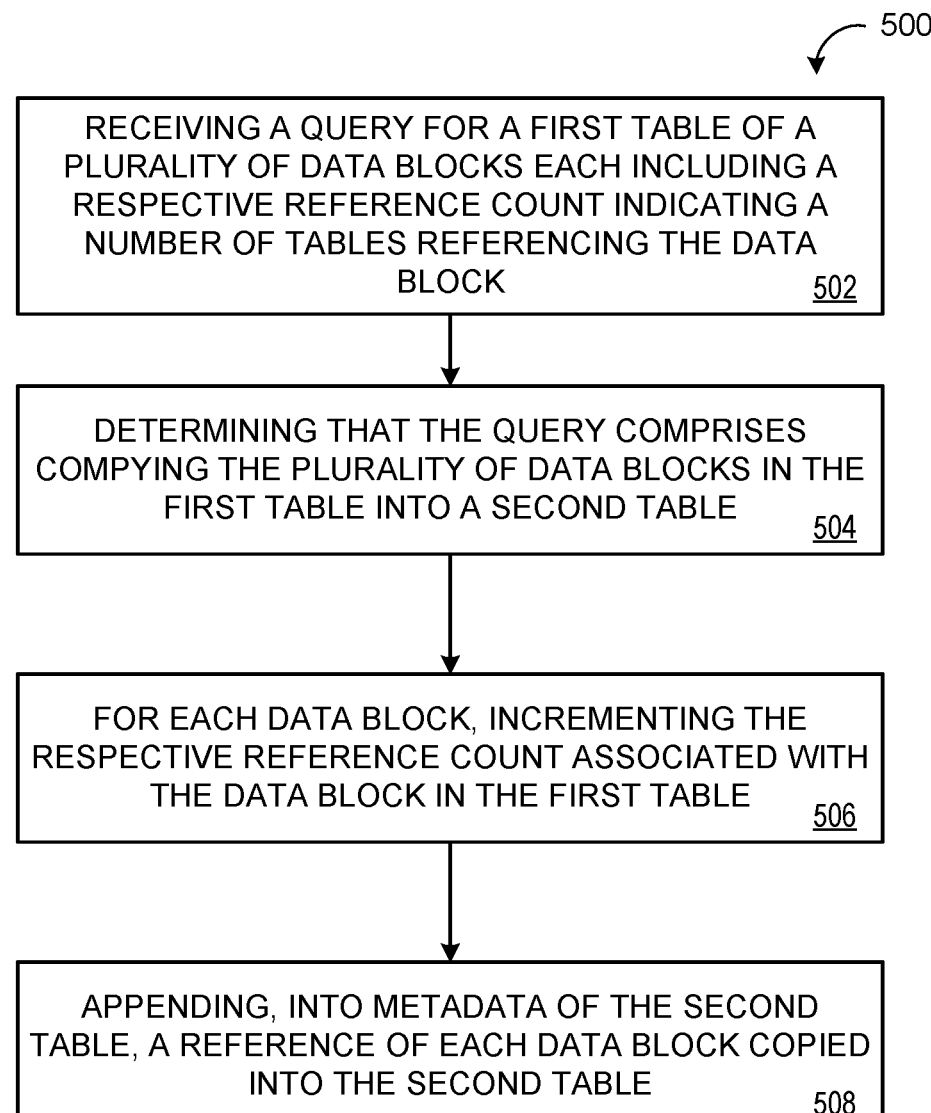

500

RECEIVING A QUERY FOR A FIRST TABLE OF A PLURALITY OF DATA BLOCKS EACH INCLUDING A RESPECTIVE REFERENCE COUNT INDICATING A NUMBER OF TABLES REFERENCING THE DATA BLOCK     502

DETERMINING THAT THE QUERY COMPRISES COMPYING THE PLURALITY OF DATA BLOCKS IN THE FIRST TABLE INTO A SECOND TABLE     504

FOR EACH DATA BLOCK, INCREMENTING THE RESPECTIVE REFERENCE COUNT ASSOCIATED WITH THE DATA BLOCK IN THE FIRST TABLE     506

APPENDING, INTO METADATA OF THE SECOND TABLE, A REFERENCE OF EACH DATA BLOCK COPIED INTO THE SECOND TABLE     508

FIG. 5

ZERO COPY OPTIMIZATION FOR SELECT * QUERIES

CROSS REFERENCE TO RELATED APPLICATIONS

This U.S. patent application is a continuation of, and claims priority under 35 U.S.C. § 120 from, U.S. patent application Ser. No. 17/315,281, filed on May 8, 2021, which claims priority under 35 U.S.C. § 119(e) to U.S. Provisional Application 63/023,409, filed on May 12, 2020. The disclosures of these prior applications are considered part of the disclosure of this application and are hereby incorporated by reference in their entireties.

TECHNICAL FIELD

This disclosure relates to techniques for zero copy optimization for database operations.

BACKGROUND

As distributed storage (i.e., cloud storage) becomes increasingly popular and storage costs decrease, sizes of cloud databases have dramatically increased. For example, tables are often terabytes if not larger in size. Operations on these tables (e.g., duplicating a table) is often quite expensive, both in system resources and time. Structured Query Language (SQL) is the standard language for relational database management systems. Users often craft SQL queries to interact with cloud databases.

SUMMARY

An aspect of the disclosure provides a method. The method includes receiving, at data processing hardware, a query specifying an operation to perform on a first table of a plurality of data blocks stored on memory hardware in communication with the data processing hardware, each data block in the first table including a respective reference count indicating a number of tables referencing the data block. The method also includes determining, by the data processing hardware, that the operation specified by the query includes copying the plurality of data blocks in the first table into a second table. The method further includes, in response to determining that the operation specified by the query includes copying the plurality of data blocks in the first table into the second table, for each data block of the plurality of data blocks in the first table copied into the second table, incrementing, by the data processing hardware, the respective reference count associated with the data block in the first table, appending, by the data processing hardware, into metadata of the second table, a reference of the corresponding data block copied into the second table.

Implementations of the disclosure may include one or more of the following optional features. In some implementations, copying the plurality of data blocks in the first table into the second table includes copying each data block in the first table into the second table without duplicating any of the plurality of data blocks. In some examples, the query includes a SELECT*Structured Query Language (SQL) statement.

In some configurations, determining that the operation specified by the query includes copying the plurality of data blocks in the first table into the second table includes, during algebrization of the query, determining sub-operations of the query, and determining that the determined sub-operations of the query include a sub-operation for writing at least one data block to the memory hardware and a sub-operation for reading at least one data block from the memory hardware. Optionally, the sub-operation for writing at least one data block to the memory hardware includes a materialize sub-operation. In some examples, the sub-operation for reading at least one data block from the memory hardware includes a scan sub-operation. Optionally, determining that the determined sub-operations of the query include the scan sub-operation for reading the at least one data block includes determining that the determined sub-operations of the query include only a single scan sub-operation for reading the at least one data block.

In some examples, determining that the query includes copying the plurality of the data blocks in the first table into the second table includes determining an order of a list of columns associated with the query, determining an order of columns of the first table, and determining that the order of the list of columns associated with the query is the same as the order of columns of the first table. In some implementations, the method further includes, while determining that the query includes copying the plurality of data blocks in the first table into the second table, initiating, by the data processing hardware, execution of the operation specified by the query over the first table. Optionally, the method further includes, in response to determining that the query includes copying the plurality of data blocks in the first table into the second table halting, by the data processing hardware, execution of the query over the first table. In some implementations, the method further includes, after appending the reference of each data block of the plurality of the data blocks into the metadata of the second table receiving, at the data processing hardware, a request to delete the first table, and decrementing, by the data processing hardware, the reference count of each data block of the first table.

Another aspect of the disclosure provides a system including data processing hardware and memory hardware in communication with the data processing hardware. The memory hardware stores instructions that when executed on the data processing hardware cause the data processing hardware to perform operations. The operations include receiving a query specifying an operation to perform on a first table of a plurality of data blocks stored on memory hardware in communication with the data processing hardware, each data block in the first table including a respective reference count indicating a number of tables referencing the data block. The operations further include determining that the operation specified by the query includes copying the plurality of data blocks in the first table into a second table. In response to determining that the operation specified by the query includes copying the plurality of data blocks in the first table into the second table, for each data block of the plurality of data blocks in the first table copied into the second table, the operations include incrementing the respective reference count associated with the data block in the first table and appending into metadata of the second table, a reference of the corresponding data block copied into the second table.

This aspect of the disclosure may include one or more of the following optional features. In some implementations, copying the plurality of data blocks in the first table into the second table includes copying each data block in the first table into the second table without duplicating any of the plurality of data blocks. In some examples, the query includes a SELECT*Structured Query Language (SQL) statement.

In some configurations, determining that the operation specified by the query includes copying the plurality of data blocks in the first table into the second table includes, during algebrization of the query, determining sub-operations of the query and determining that the determined sub-operations of the query include a sub-operation for writing at least one data block to the memory hardware and a sub-operation for reading at least one data block from the memory hardware. Optionally, the sub-operation for writing at least one data block to the memory hardware includes a materialize sub-operation. In some examples, the sub-operation for reading at least one data block from the memory hardware includes a scan sub-operation. In some implementations, determining that the determined sub-operations of the query include the scan sub-operation for reading the at least one data block includes determining that the determined sub-operations of the query include only a single scan sub-operation for reading the at least one data block.

In some examples, determining that the query includes copying the plurality of the data blocks in the first table into the second table includes determining an order of a list of columns associated with the query, determining an order of columns of the first table, and determining that the order of the list of columns associated with the query is the same as the order of columns of the first table. In some examples, the operations further include, while determining that the query includes copying the plurality of data blocks in the first table into the second table, initiating execution of the operation specified by the query over the first table. Optionally, the operations further include, in response to determining that the query includes copying the plurality of data blocks in the first table into the second table, halting execution of the query over the first table. In some implementations, the operations further include, after appending the reference of each data block of the plurality of the data blocks into the metadata of the second table, receiving a request to delete the first table and decrementing the reference count of each data block of the first table.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a flowchart of an example arrangement of operations for a method of optimizing queries for tables.

Like reference symbols in the various drawings indicate like elements.

DETAILED DESCRIPTION

Distributed storage (i.e., cloud storage) has been increasingly used to store tables or databases of massive size. It is not uncommon for a table to have a size of multiple terabytes or even petabytes and to include millions of entries (i.e., data blocks). Querying (i.e., reading and writing) these tables is often extremely resource intensive. An example of a very resource intensive operation is duplicating or copying a portion or all of a table. In some fault tolerant databases, the databases make a copy of data to support large query outputs. For example, a user may use the Structured Query Language (SQL) query SELECT*to select and read and/or duplicate an entire first table into a second table. This query typically requires reading each data block that contains rows for the table (consuming disk and network bandwidth) and decoding the rows from an on-disk format to an in-memory format. Subsequently, these rows are encoded as new blocks in the on-disk format, consuming further computational resources. Furthermore, because the new data blocks are entirely independent of the original data blocks, the newly generated data blocks increase the amount of disk space needed to store the data. In some scenarios, a full shuffle of the data is performed in order to determine the best layout.

Implementations herein are directed toward a query optimizer that receives a query for a table of data blocks stored on memory hardware. The query optimizer determines that the query includes copying the plurality of data blocks in the table to a new table. For each data block copied, the query optimizer increments a respective reference count associated with the data block and appends, into metadata of the new table, a reference of each data block copied into the new table. Thus, the query optimizer significantly improves latencies of such queries by removing duplicate storage costs by using an O(1) operation. The query optimizer stores pointers to the metadata of the original table, thus removing all expensive disk writes and additional storage costs.

Figure 1:
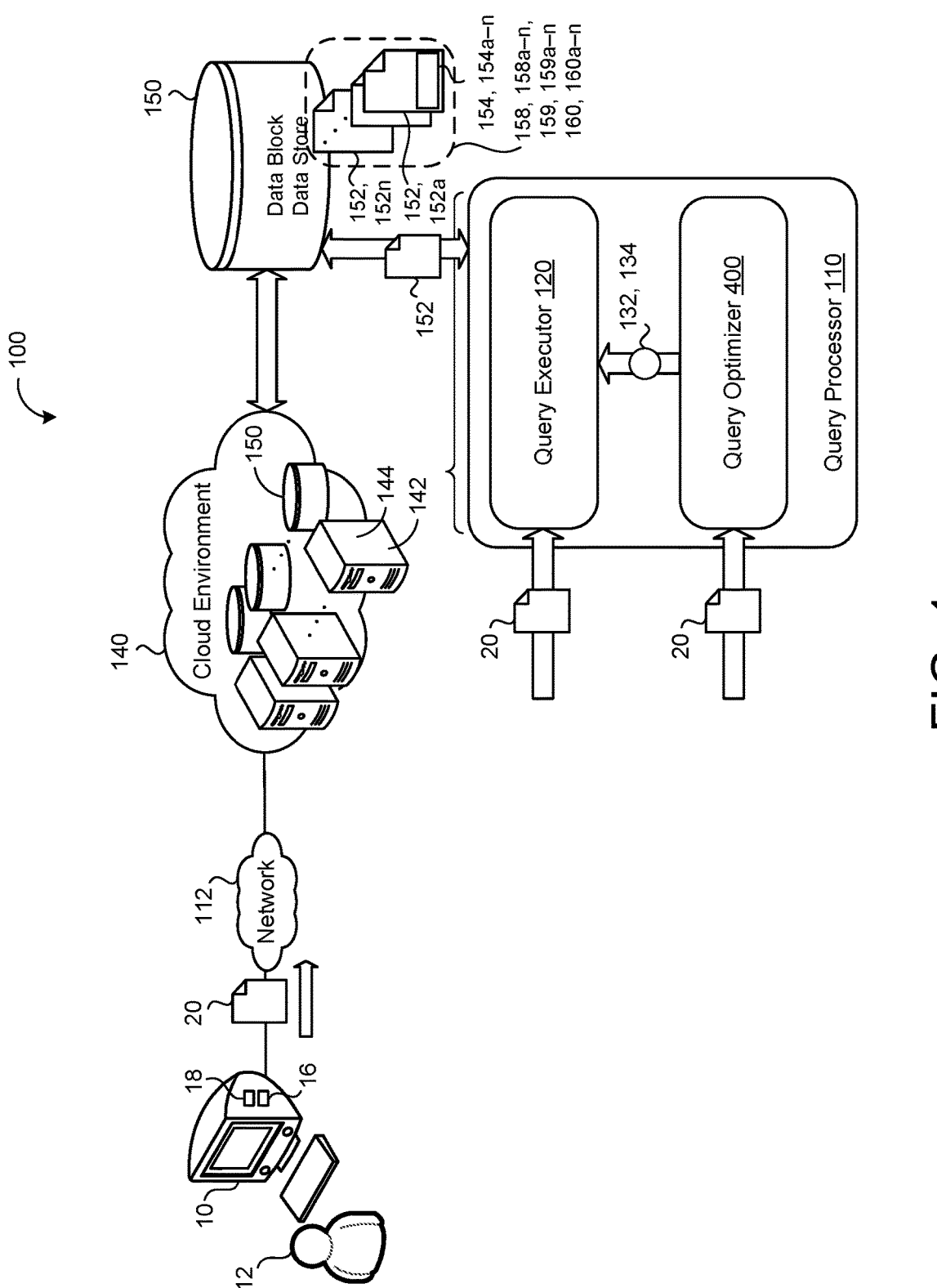
FIG. 1 is a schematic view of an example system for optimization of queries for tables.

Referring now to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the client or computing resources 144. The data store 150 is configured to store a plurality of data blocks 152, 152*a-n* stored within a data structure 158 (e.g., a table 158).

Each data block 152 includes a reference count 154, 154*a-n* that indicates a number of different tables 158 that references the respective data block 152 (i.e., includes the respective data block 152 in the table 158). For example, a data block 152 with a reference count 154 of '1' has one table that references (i.e., points) to the data block 152. Similarly, a data block 152 with a reference count 154 of '2' has two tables that reference the data block 152. Here, two separate tables 158 each include the same data block 152. Thus, while the data block 152 may occupy a single location in physical memory of the data store 150, multiple tables may include the same data block 152. This allows the data block 152 to exist in multiple tables 158 simultaneously without the data block 152 requiring duplicative locations in the data store 150.

The remote system 140 executes a query processor 110 that is configured to receive a query 20 from the user device 10 via the network 112. The query 20 specifies an operation for the query processor 110 to execute on a table 158 of the data store 150. In the example shown, the query 20 specifies a copy operation that includes copying a plurality of data blocks 152 from a first table 158 to a second table 158. For example, the query 20 may include a SQL command specifying a "SELECT*" statement and respective source and destination tables 158.

Conventional techniques execute SELECT*queries in a manner that is considerably expensive both in time and computational resources. For example, these techniques read each data block 152 that contains rows for the respective table 158. From there, the techniques typically include decoding each row from an on-disk format (optimizes for storage on non-volatile memory) to an in-memory format (optimized for storage in volatile memory). The data blocks are then duplicated and then encoded back into the on-disk format and stored again in non-volatile memory. Furthermore, the techniques may include a full shuffle of all of the rows depending on the desired layout of the data.

The query processor 110 includes both a query executor 120 and a query optimizer 400. The query executor 120 receives the query 20 and executes the operation specified by the query 20 using any traditional techniques. For example, the query executor 120 parses and algebrizes the query 20 (e.g., an SQL command) and executes the query 20 over one or more tables 158. Based on the query 20, the query executor 120 may execute a read and/or write operation one or more data blocks 152 from one or more tables 158 stored on the data store 150.

Figure 2A:
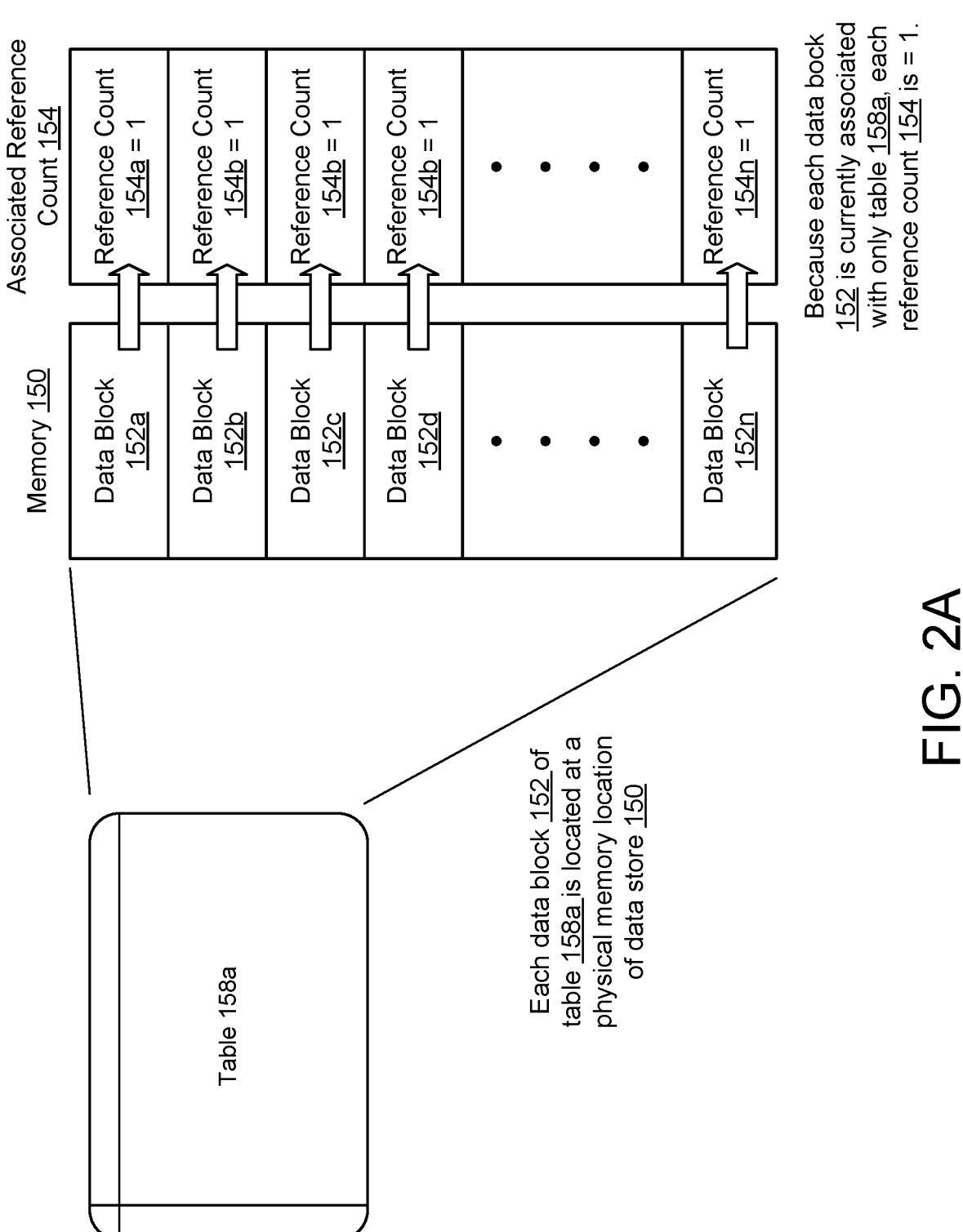
FIGS. 2A-2C are schematic views of copying data blocks from a first table to a second table with zero copy optimization.
Figure 2B:
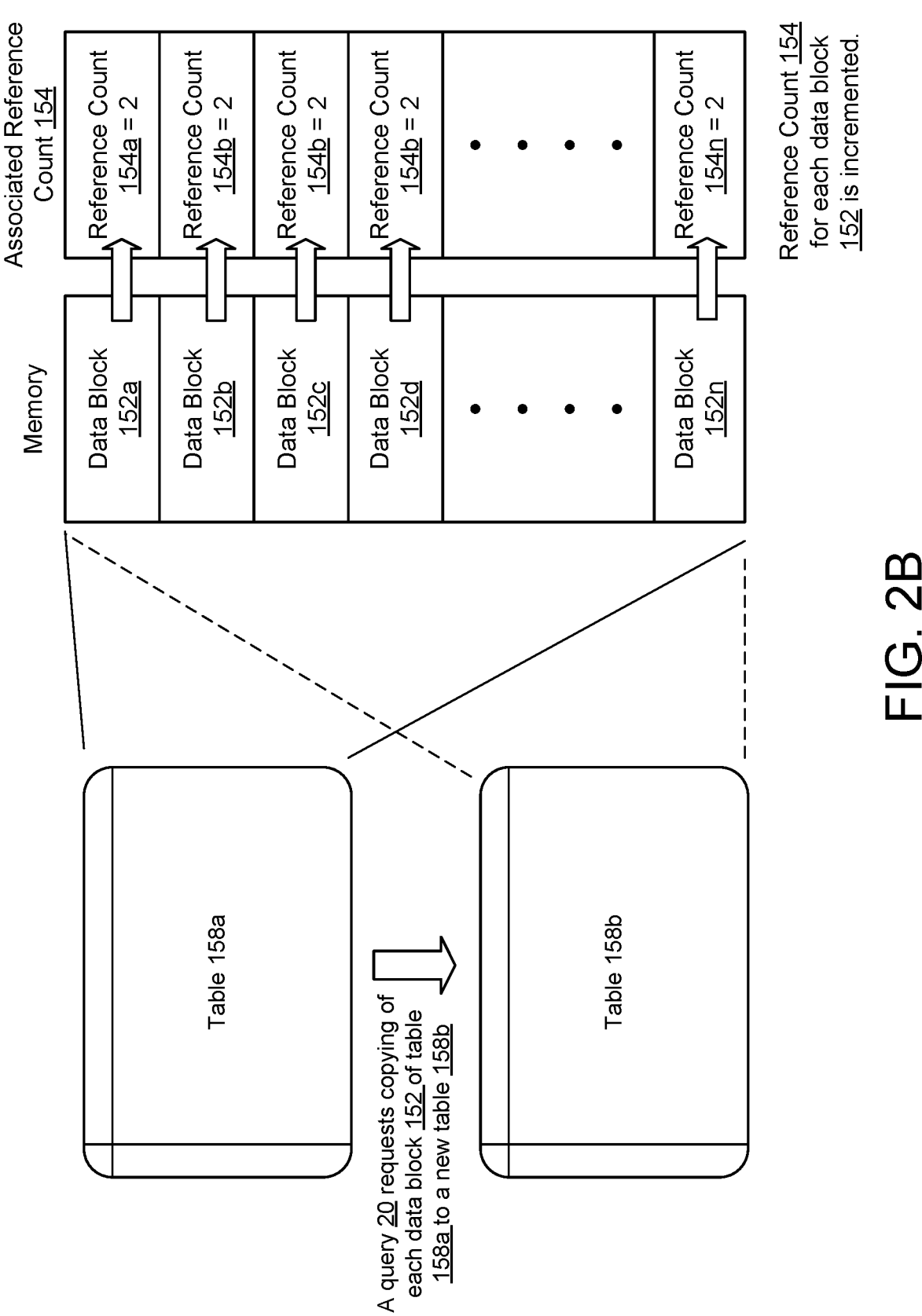
Figure 2C:
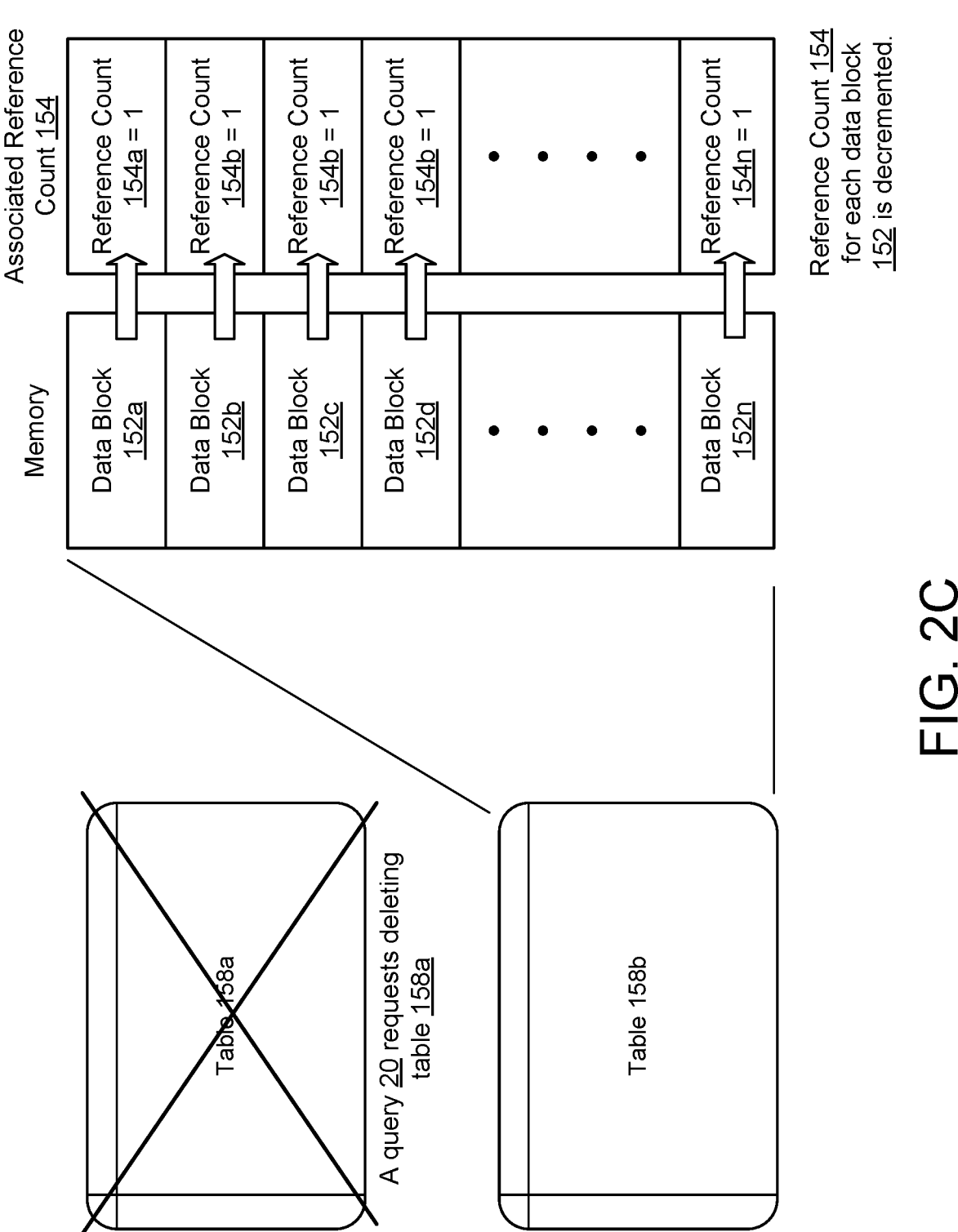

The query optimizer 400 also receives the query 20 in parallel with the query executor 120. In some examples, the query optimizer 400 determines that the query 20 specifies an operation of copying a plurality of data blocks 152 of a first table 158a to a second table 158b (FIGS. 2A-C). For example, the query 20 includes the SQL statement "INSERT INTO table2 SELECT*table1" where "table1" represents the first table 158a and "table2" represents the second table 158b.

When the query optimizer 400 determines that the query 20 includes the operation of copying data blocks 152 from the first table 158a to the second table 158b, the query processor 110 increments, for each data block 152 of the plurality of data blocks 152 copied into the second table 158b, the respective reference count 154 for the data block 152. As discussed in more detail below, the incrementing of the reference count 154 indicates that an additional table 158 (the second table 158b in this example) also includes the respective data blocks 152. Additionally, the query processor 110 appends, into metadata 159, 159b of the second table 158b, a reference 160, 160a-n of each data block 152 of the plurality of data blocks 152 copied into the second table 158b. Thus, each table 158 includes references 160 within metadata 159 associated with the respective table 158 that indicates the location of each data block 152 stored within the respective table 158. Each data block 152 includes a reference count 154 that indicates the number of tables 158 that the respective data block 152 is associated with.

In some implementations, simultaneous with the query optimizer 400 determining that the query 20 specifies the copy operation of copying a plurality of data blocks 152 from the first table into the second table, the query executor 120 begins executing, using traditional techniques mentioned above, the copy operation specified by the query 20. That is, to avoid impacting query latency (i.e., how long the query 20 takes to execute), the query processor 110 begins executing (i.e., using the query executor 120) the copy operation specified by the query 20 using standard techniques in parallel with determining (e.g., using the query optimizer 400) whether the query 20 is a candidate for optimization (e.g., the query 20 includes a SELECT*statement). Optionally, after the query optimizer 400 determines that the query 20 does include copying a plurality of data blocks 152 from the first table 158a to the second table 158b, and thus, is a candidate for optimization, the query processor 110 halts the execution of the query 20 by the query executor 120. For example, the query optimizer 400 transmits a halt message 132 to the query executor 120 to halt the execution of the query 20. The query optimizer 400 may subsequently or simultaneously transmit an optimized query or operation 134 to the query executor 120 to execute in lieu of the query 20. The optimized operation 134 may specify a "shallow copy" for the query executor 120 to now perform that simply includes incrementing the associated reference counts 154 of the respective data blocks 152. That is, the query optimizer 130, in response to determining that the query 20 includes a SELECT*operation, optimizes the operation to include incrementing the respective reference counts 154 of the data blocks 152 and appending references 160 into the metadata 159 of the new table 158. The query optimizer 130 may halt the current execution of the query 20 by the query executor 120 and substitute the optimized operation 134 for the original operation. The query executor 120 may process with execution of the optimized operation 134.

Thus, the query processor 110 effectively performs a "shallow copy" to convert an operation from being O(number of rows) to O(1) in terms of data size. Because the query optimization is a metadata operation, the optimization does not duplicate any data blocks on disk nor consume any CPU in decoding or encoding rows. For large tables, this allows the query optimization to be orders of magnitude faster than the naive technique of deep copying data.

Referring now to FIGS. 2A-C, in the example shown, the first table 158a includes data blocks 152a-n, each stored at a single physical location on the data store 150 (FIG. 2A). Each data block 152 of the table 158a includes an associated reference count 154, 154a-n. Here, because the table 158a is the only table 158 that includes each data block 152, the associated reference count 154 for each data block 152 is '1'. References 160 to each data block 152 is stored within metadata 159 (not shown) associated with the first table 158a so that the first table 158a can keep track of each included data block 152.

In FIG. 2B, a query 20 requests copying of each data block 152 of the table 158a into the second table 158b. Again, each data block 152 is stored at a single physical location on the data store 150. However, in this case, the query processor 110 increments the associated reference count 154 of each data block 152 to '2'. This represents that each data block 152 is now included within two tables 158 (i.e., the first table 158a and the second table 158b). As with the first table 158a, references 160 to each data block 152 is stored within metadata 159 associated with the second table 158b so that the second table 158b can keep track of each included data block 152.

In the current example, both the first table 158a and the second table 158b reference or point to the same data blocks 152 stored on the data store 150 so that data is not needlessly duplicated. If a subsequent query 20 alters one or more of the data blocks 152 for both the first and second tables 158a, 158b, the query processor 110 may simply modify the data associated with the data blocks 152 and both tables 158*a*, 158*b* remain in sync. However, if a subsequent query 20 alters one or more of the data blocks 152 for only one of the first or the second table 158*a*, 158*b*, the query processor 110 may duplicate the data block 152 to another location on the data store 150 so that each table has an independent data block 152, update the references 160 and reference counts 154 accordingly, and then modify the appropriate data block 152.

Referring now to FIG. 2C, in some examples, the query processor 110 receives a query 20 that includes a request to delete the first table 158*a*. In response, the query optimizer 400 decrements the reference count 154 of each data block 152 of the first table 158*a*. This returns the reference count of each data block 152 in the example to '1'. However, here each data block 152 is included in the second table 152*b* only. The query processor 110 may now delete the first table 158*a*. While in the example shown, the first table 158*a* was deleted, the second table 158*b* can be deleted similarly. If a subsequent query 20 deletes the second table 158*b* after the first table 158*a* has already been deleted, the query optimizer 400 again decrements the reference count 154 for each data block 152 in the second table 158*b*. In this scenario, the reference count 154 is now equal to '0' and thus each data block 152 is no longer associated with a table 158 and may be marked for garbage collection (i.e., permanently deleted from the data store 150).

Figure 3:
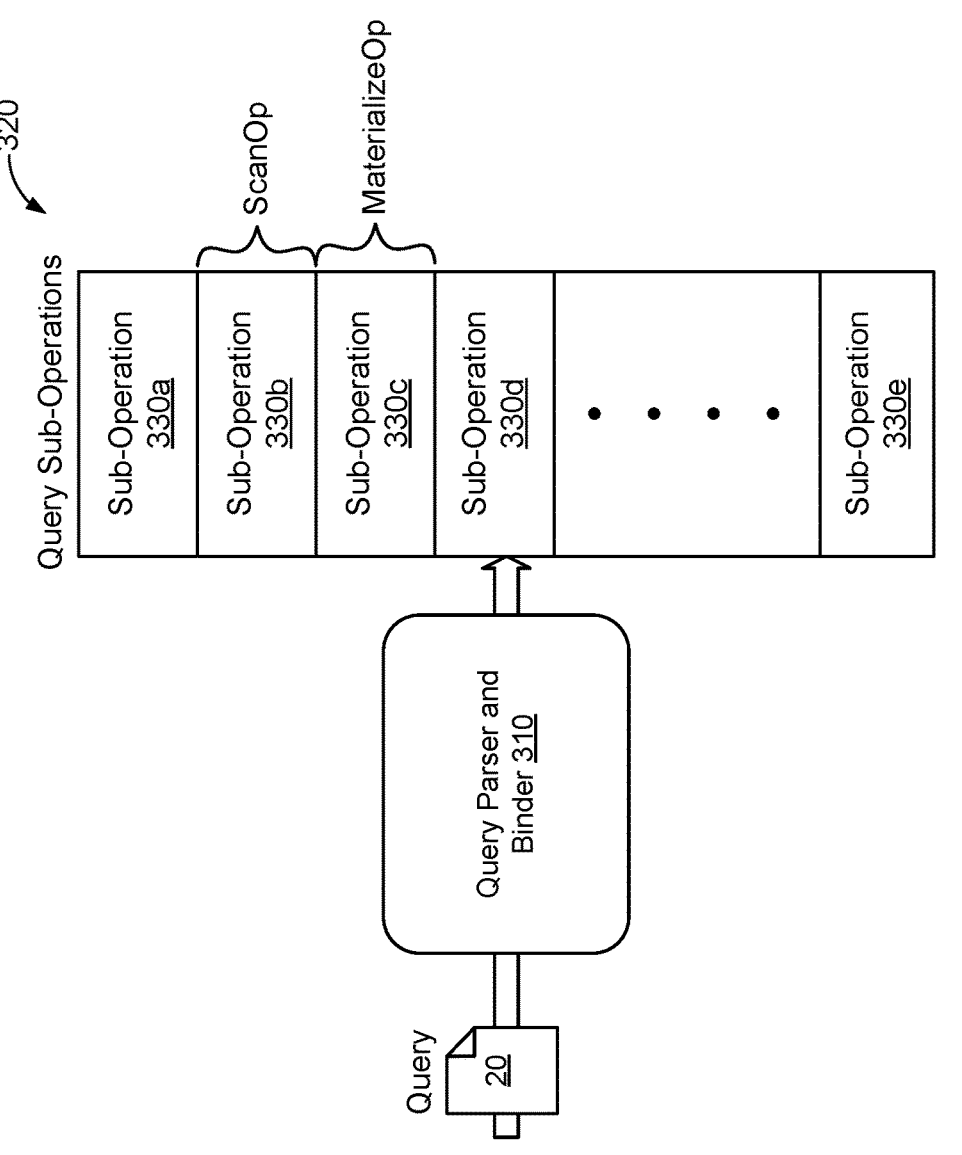
FIG. 3 is a schematic view of query operations.

Referring now to FIG. 3, in some implementations, the query processor 110 includes a query parser and binder 310 that receives the query 20 and coverts or translates the query (e.g., a SQL statement) into a low level expression 320 that can be used at the physical level of the data store. The low level expression 320 includes one or more (generally several) sub-operations 330, 330*a-n* that, when executed sequentially, performs the operation specified by the initial query 20. In some examples, the query 20 includes a SELECT*SQL statement to copy each data block 152 of a first table 158 into to a second table 158. To determine that the query 20 includes a request to copy a plurality of data blocks 152 from one table 158 to another (and thus is eligible for optimization), the query optimizer 400 may, during algebrization (also referred to as binding), determine the sub-operations 330 of the query 20. Based on these sub-operations 330, the query optimizer 400 may determine that the query 20 includes a sub-operation 330 for writing at least one data block 152 to the data store 150 and a sub-operation 330 for reading at least one data block 152 from the data store 150. In some examples, the sub-operation 330 for writing at least one data block 152 to the data store 150 is a materialize sub-operation 330. The sub-operation 330 for reading at least one data block 152 from the data store 150 may be a scan sub-operation 330.

Optionally, the query optimizer 400 determines that a query 20 includes a SELECT*statement when a materialize sub-operation 330 is directly above a scan sub-operation 330. That is, in the order of execution of the sub-operations 330 of the low level expression 320, the presence of a scan sub-operation 330 immediately followed by a materialize sub-operation 330 indicates to the query optimizer 400 that the query 20 includes a SELECT*statement. In some implementations, the query optimizer 400 ensures that there is only a single scan sub-operation 330 and thus only a single input table 158. That is, when the query optimizer 400 determines that the sub-operations 330 of the query 20 include a scan operation for reading the at least one data block 152, in some examples, the query optimizer 400 determines that the sub-operations 330 of the query 20 include only a single scan sub-operation 330 for reading the at least one data block 152.

Figure 4:
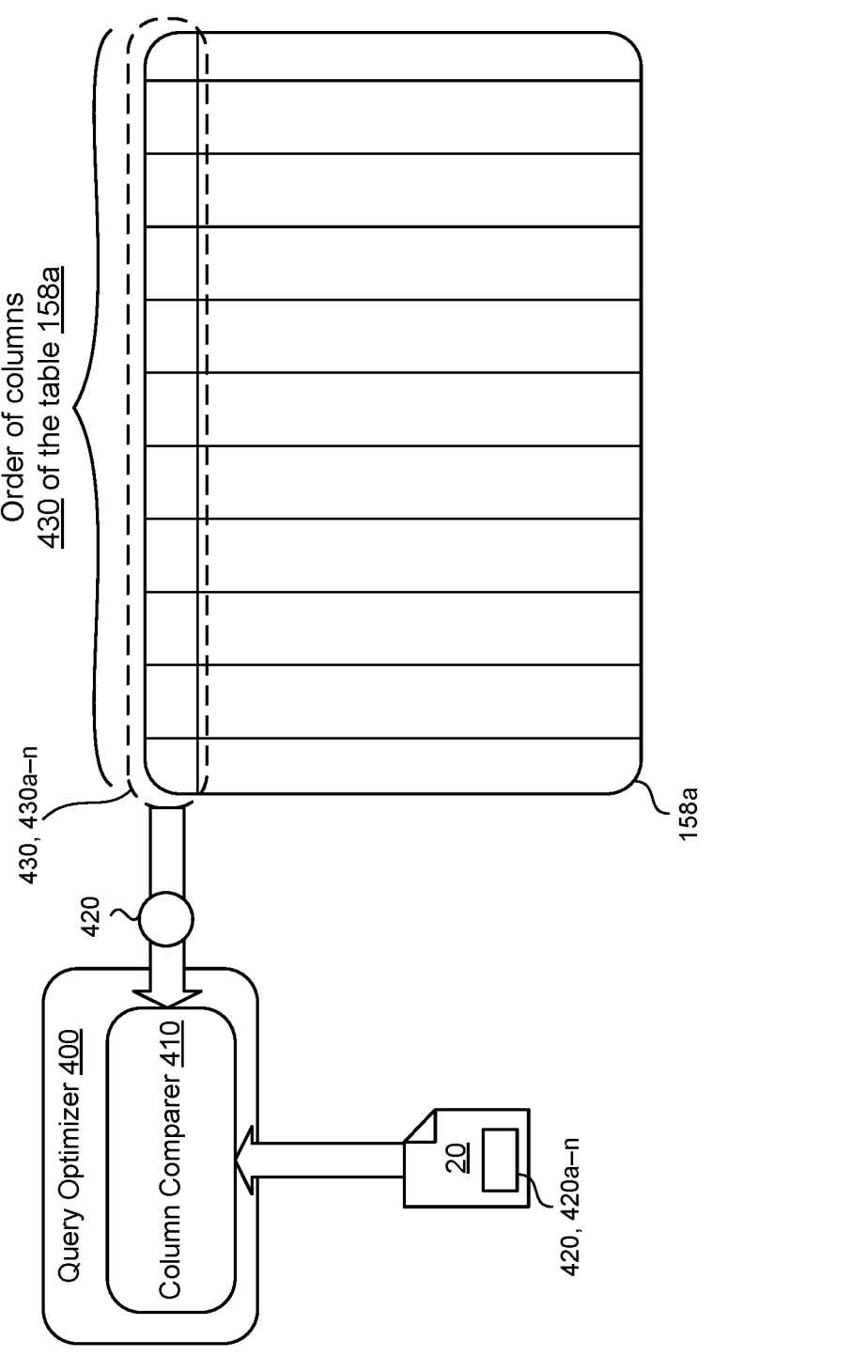
FIG. 4 is a schematic view of exemplary components of a query optimizer for comparing lists of table columns.

Referring now to FIG. 4, to further detect the presence of a SELECT*statement or other query 20 elements that include copying data blocks 152 from one table 158 to another, the query optimizer 400, in some implementations, determines an order of a list of columns 420, 420*a-n* associated with the query 20. That is, the query 20, after parsing and binding (FIG. 3), includes a list of columns 420 that the query 20 is instructing the query processor 110 to operate on. For instance, the list of columns 420 may include columns 420 associated with the second table 158 (i.e., destination table 158) of where the data blocks 152 will be copied. When the query 20 includes a SELECT*statement, typically the query 20 will include every column of the table 158 in order. The query optimizer 400 also determines an order of columns 430 of the first table 158 (i.e., the original/source table 158). The query optimizer 400, at a column comparer 410, determines that the order of the list of columns 420 associated with the query 20 is the same as the order of columns 430 of the first table 158*a*. When the lists of columns 420, 430 match, the query 20 may include an intent to copy the entire first table 158*a* to the second table 158*b*. Thus, instead of searching for a SELECT*statement explicitly in the query 20 (which may be difficult to parse), the query processor 110 analyzes the list of columns 420 produced by the query 20 and compares this list to the list of columns 430 in the first table 158*a*.

In some implementations, the query processor 110 optimizes queries 20 that include filters. For example, a table 158 includes a column "ts" of timestamps. A query 20 may include the SQL statement "INSERT INTO new_table SELECT*from T WHERE DATE(ts)='2020-01-01'." In this example, the query processor 110 may fetch and process (e.g., increment the associated reference count 154) only the data blocks 152 that correspond to the query 20. That is, the query processor 110 may optimize queries 20 that copy only a portion of a table 158 in addition to an entire table 158.

FIG. 5 is a flowchart of an exemplary arrangement of operations for a method 500 of optimizing queries for tables. The method 500, at operation 502, includes receiving, at data processing hardware 144, a query 20 specifying an operation to perform on a first table 158*a* of a plurality of data blocks 152 stored on memory hardware 150 in communication with the data processing hardware 144. Each data block 152 in the first table 158*a* includes a respective reference count 154 indicating a number of tables 158 (including the first table 158*a*) referencing the data block 152. At operation 504, the method 500 includes determining, by the data processing hardware 144, that the query 20 specifies the operation of copying the plurality of data blocks 152 in the first table 158*a* into a second table 158*b*.

In response to determining that the query 20 specifies the operation of copying the plurality of data blocks 152 into the second table 158*b*, for each data block 152 of the plurality of data blocks 152 in the first table 158*a* copied into the second table 158*b*, the method 500 includes, at operation 506, incrementing, by the data processing hardware 144, the respective reference count 154 associated with the data block 152 in the first table 158*a*, and at operation 508, appending, by the data processing hardware 144, into metadata 159 of the second table 158*b*, a reference 160 of the corresponding data block 152 copied into the second table 158*b*.

Figure 6:
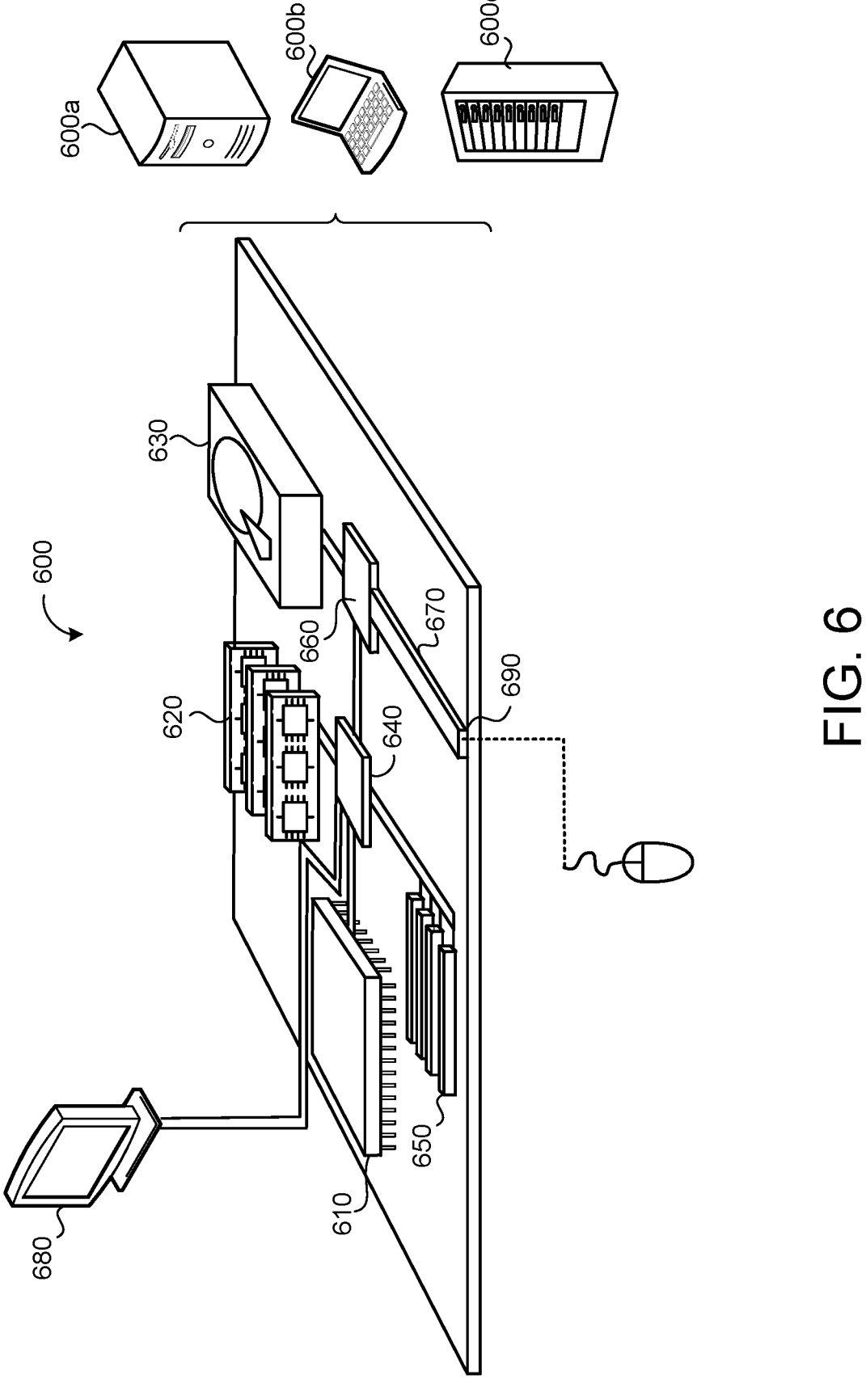
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, by data processing hardware, a query specifying an operation to perform on a database stored on memory hardware in communication with the data processing hardware, the query comprising a copy operation for copying a plurality of data blocks of a first table stored in the database into a second table in the database, each data block of the first table comprising a respective reference count indicating a number of tables referencing the data block;
   initiating, by the data processing hardware and in a first process, the copy operation for copying the plurality of data blocks from the first table into the second table;
   determining, by the data processing hardware and in a second process that runs in parallel with the first process, whether the copy operation for copying the plurality of data blocks comprises copying the plurality of data blocks in the first table into the second table;
   responsive to determining that the copy operation for copying the plurality of data blocks comprises copying the plurality of data blocks in the first table into the second table, halting, by the data processing hardware, execution of the first process;

executing, by the data processing hardware, the query without duplicating any of the plurality of data blocks by, for each data block of the plurality of data blocks:
      appending, into metadata of the second table, a reference to a respective data block in the first table; and
      incrementing the respective reference count associated with the respective data block in the first table;
   receiving, by the data processing hardware, a request to alter a particular data block of the plurality of data blocks stored on the memory hardware for the first table;
   generating, by the data processing hardware, a new particular data block in the memory hardware by duplicating the particular data block in the memory hardware;
   altering, by the data processing hardware, the new particular data block according to the request; and
   updating, by the data processing hardware, the respective reference for the particular data block in the first table to refer to the new particular data block.

2. The method of claim 1, wherein determining, by the data processing hardware, whether the copy operation for copying the plurality of data blocks comprises copying the plurality of data blocks in the first table into the second table comprises determining that the copy operation comprises a SELECT*Structured Query Language (SQL) statement.

3. The method of claim 1, further comprising, after appending the reference to the respective data block for each data block of the plurality of data blocks:
   receiving, by the data processing hardware, a request to delete the second table; and
   decrementing, by the data processing hardware, the respective reference count of each data block of the first table.

4. The method of claim 1, further comprising, after appending the reference to the respective data block for each data block of the plurality of data blocks:
   receiving, by the data processing hardware, a request to delete the first table; and
   decrementing, by the data processing hardware, the respective reference count of each data block of the first table.

5. The method of claim 1, wherein the first table comprises a respective reference for each data block of the plurality of data blocks stored on the memory hardware.

6. The method of claim 5, further comprising:
   receiving, by the data processing hardware, a request to alter a particular data block of the plurality of data blocks stored on the memory hardware; and
   altering, by the data processing hardware, the particular data block according to the request without altering the first table or the second table.

7. The method of claim 1, wherein determining, by the data processing hardware, whether the copy operation for copying the plurality of data blocks comprises copying the plurality of data blocks in the first table into the second table comprises determining that the query comprises a filter operation.

8. A system comprising:
   data processing hardware; and
   memory hardware in communication with the data processing hardware, the memory hardware storing instructions that, when executed on the data processing hardware, cause the data processing hardware to:
      receive a query specifying an operation to perform on a database stored on memory hardware in communication with the data processing hardware, the query comprising a copy operation for copying a plurality of data blocks of a first table stored in the database into a second table in the database, each data block of the first table comprising a respective reference count indicating a number of tables referencing the data block;

initiate, in a first process, the copy operation for copying the plurality of data blocks from the first table into the second table;

determine, in a second process that runs in parallel with the first process, whether the copy operation for copying the plurality of data blocks comprises copying the plurality of data blocks in the first table into the second table;

responsive to determining that the copy operation for copying the plurality of data blocks comprises copying the plurality of data blocks in the first table into the second table, halting, by the data processing hardware, execution of the first process;

execute the query without duplicating any of the plurality of data blocks by, for each data block of the plurality of data blocks:

appending, into metadata of the second table, a reference to a respective data block in the first table; and incrementing the respective reference count associated with the respective data block in the first table;

receive a request to alter a particular data block of the plurality of data blocks stored on the memory hardware for the first table;

generate a new particular data block in the memory hardware by duplicating the particular data block in the memory hardware;

alter the new particular data block according to the request; and update the respective reference for the particular data block in the first table to refer to the new particular data block.

9. The system of claim 8, wherein the instructions that cause the data processing hardware to determine that the copy operation for copying the plurality of data blocks comprises copying the plurality of data blocks in the first table into the second table include instructions that cause the data processing hardware to determine that the copy operation comprises a SELECT*SQL statement.

10. The system of claim 8, wherein the instructions further cause the data processing hardware to, after appending the reference to the respective data block for each data block of the plurality of data blocks:

receive a request to delete the second table; and decrement the respective reference count of each data block of the first table.

11. The system of claim 8, wherein the instructions further cause the data processing hardware to, after appending the reference to the respective data block for each data block of the plurality of data blocks:

receive a request to delete the first table; and decrement the respective reference count of each data block of the first table.

12. The system of claim 8, wherein the first table comprises a respective reference for each data block of the plurality of data blocks stored on the memory hardware.

13. The system of claim 12, wherein the instructions further cause the data processing hardware to:

receive a request to alter a particular data block of the plurality of data blocks stored on the memory hardware; and alter the particular data block according to the request without altering the first table or the second table.

14. The system of claim 8, wherein the instructions that cause the data processing hardware to determine that the copy operation for copying the plurality of data blocks comprises copying the plurality of data blocks in the first table into the second table include instructions that cause the data processing hardware to determine that the query comprises a filter operation.

* * * * *